J. C. BARBER.
CAR TRUCK.
APPLICATION FILED APR. 23, 1909.
933,224.
Patented Sept. 7, 1909.
3 SHEETS—SHEET 2.
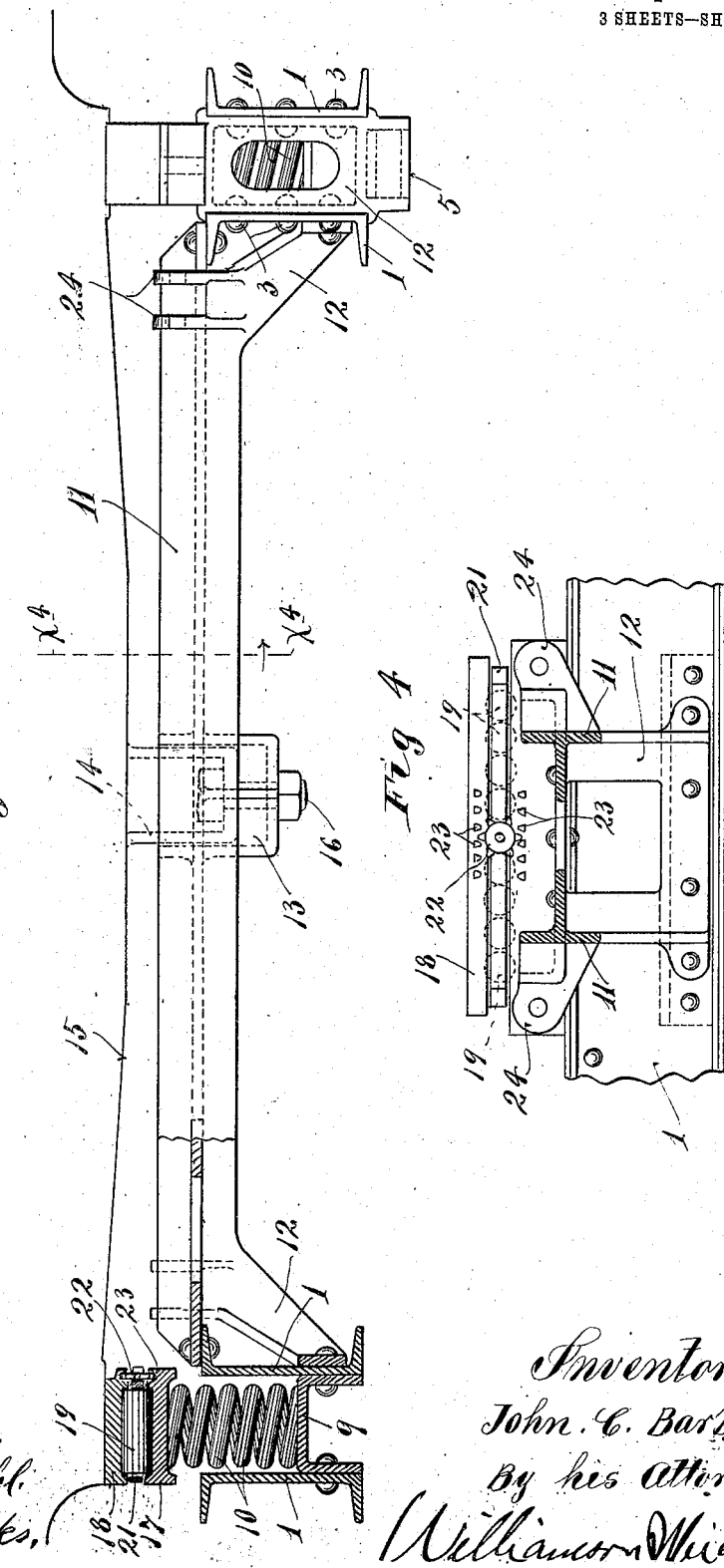
Witnesses
A. H. Opschl
Ted P. Hicks
Inventor
John C. Barber
By his Attorneys
Williamson Wiehand

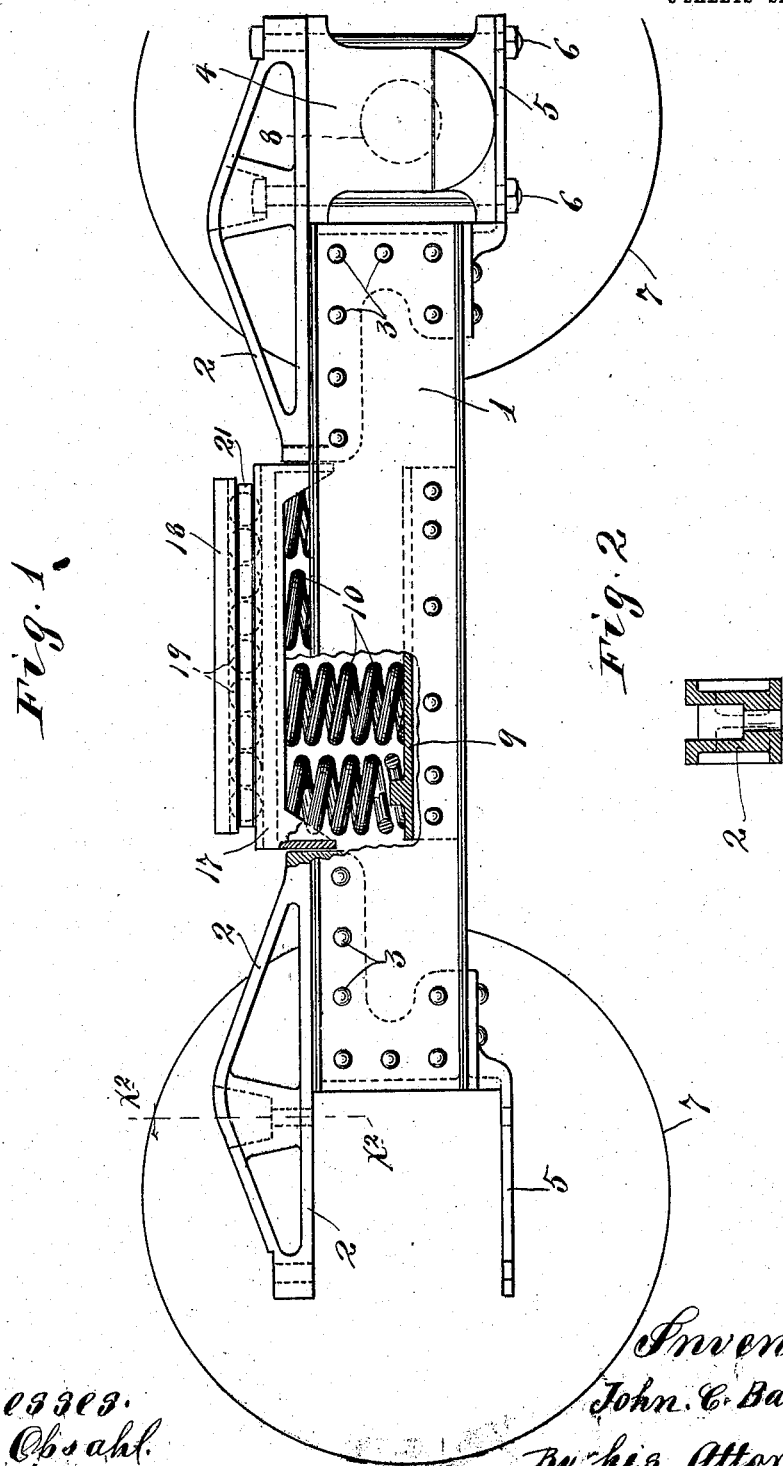

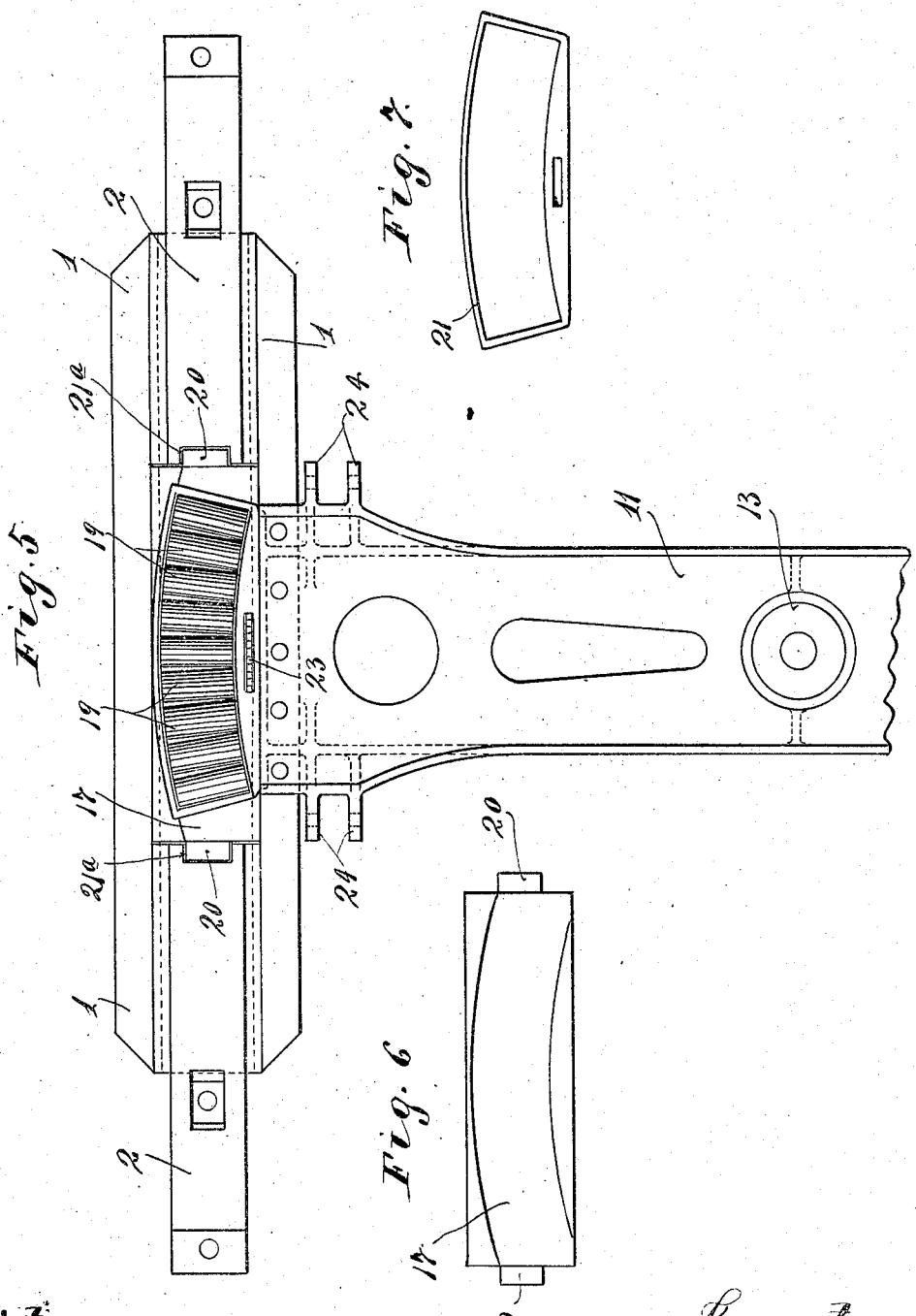

UNITED STATES PATENT OFFICE.

JOHN C. BARBER, OF CHICAGO, ILLINOIS.

CAR-TRUCK.

933,224.  Specification of Letters Patent.  Patented Sept. 7, 1909.

Application filed April 23, 1909. Serial No. 491,673.

*To all whom it may concern:*

Be it known that I, JOHN C. BARBER, a citizen of the United States, residing at Chicago, in the county of Cook and State of Illinois, have invented certain new and useful Improvements in Car-Trucks; and I do hereby declare the following to be a full, clear, and exact description of the invention, such as will enable others skilled in the art to which it appertains to make and use the same.

My present invention has for its object to provide an improved car truck, and to this end, it consists of the novel devices and combinations of devices hereinafter described and defined in the claims.

The drawings which illustrate my present invention, show the car truck having side frames that are very similar to those disclosed and claimed in my copending application S. N. 490,297 filed of date April 16, 1909. In my said copending application, the truck bolster was spring mounted for vertical movements, and was mounted on roller devices for endwise movements transversely of the truck. In my present invention, the truck bolster is rigidly connected at its ends to the truck side frames. The car body is mounted and supported on roller side bearings, which in turn are supported for vertical movements by springs seated in the truck side frames. In this truck, therefore, lateral motion devices or devices for permitting movements of the car body transversely of the truck are not provided, and the weight of the car body and its load, instead of being transmitted to the trucks through the truck bolsters, is delivered directly to the side frames of the trucks through side bearings located directly over, or within the transverse dimensions of the said truck side frames, so that the latter take the load free from torsional strains and little or no part of the load is carried through the truck bolsters.

In the accompanying drawings which illustrate the invention, like characters indicate like parts throughout the several views.

Referring to the drawings: Figure 1 is a view in side elevation, showing the improved car truck, some parts being broken away and some parts being removed; Fig. 2 is a detail in vertical section on the line $x^2$ $x^2$ of Fig. 1; Fig. 3 is a view partly in transverse vertical section, and partly in end elevation, showing the improved car truck with the wheels and certain of the other parts removed; Fig. 4 is a vertical section taken on the line $x^4$ $x^4$ of Fig. 3, some parts being broken away; Fig. 5 is a plan view, showing approximately one-half of the improved truck frame, some parts broken away; Fig. 6 is a detail view in plan, showing the lower member of one of the spring supported side bearings; and Fig. 7 is a detail view in plan, showing the roller cage plate of one of the side bearings.

As preferably constructed, each side frame of the truck is made up of a pair of laterally spaced parallel steel channel beams 1, and a pair of cast steel end brackets 2. These end brackets 2 have depending flanged portions, that serve to space apart the ends of the channel beams 1, and are rigidly secured to the vertical webs thereof by rivets 3. The upper portions of the said end brackets 2 are in the form of ribbed arms, the extended portions of which rest upon the coöperating axle boxes 4, one of which latter is shown diagrammatically at the right in Fig. 1. The bottoms of the boxes 4 are engaged by short independent bottom bars 5 shown as secured by rivets to the lowermost end portions of the end brackets 2. The axle boxes are secured to the projecting arms of the end brackets 2, and to the bottom bars 5 by nutted bolts 6. The numeral 7 indicates the wheels diagrammatically, said wheels being secured to axles 8 in the usual way, and the said axle being journaled in the boxes 4 in the customary way. The lower intermediate portions of the two channel beams 1 are rigidly tied together by a spring base 9, which, as shown, is of inverted channel form, and the flanges of which are riveted to the vertical webs of said beams.

The coiled springs 10, which support the car body from the truck side frames, are preferably arranged in tandem or spaced in a straight row longitudinally of the side frames, and they are mounted in the seats formed therefor, between the channel beams 1 and the end brackets 2, and at their lower ends are seated directly upon the spring base 9.

The truck bolster may be made in different ways, but is preferably in the form of a cast steel I-beam 11, provided at its ends with integrally formed flanged heads 12. These heads 12 are preferably slightly inclined, and at their extreme lower ends, they are riveted to the inner channel beams 1, while the ends proper of the said I-beam 11 are overlapped with and riveted to the upper flanges of the said inner channel beams 1. In this way the truck bolster 11 is very rigidly united with the truck side frames. At its central portion, the truck bolster 11 is formed with a cylindrical hub or pocket 13 which receives a correspondingly formed, but smaller hub 14 of the car body bolster 15. These two hubs 13 and 14 pivotally connect the two bolsters 11 and 15, or otherwise stated, pivotally connect the truck to the car body. The lower end of the hub 14 terminates above the bottom of the hub or pocket 13 so that the car body is capable of vertical movements in respect to the truck. As shown, a nutted bolt 16 is passed through the bottoms of the telescoped hubs 13 and 14, to limit the upward movement of the body bolster 15 in respect to the truck bolster 11. The said hubs 13 and 14 afford the desired pivotal connection between the truck and car body, but do not constitute a center bearing proper, because the weight of the car body and its load is not transmitted to the truck through the said hubs 13 and 14.

The side bearings that support the car body from the truck side frames through the springs 10, comprise each a lower roller bearing plate 17, an upper roller bearing plate 18, an interposed rollers 19. The lower plates 17 which act as combined spring caps and roller bases, are directly seated on the upper ends of the springs 10, and are guided for vertical movements by the upper portions of the spring receiving pockets formed between the channel beams 1 and the end brackets 2. Preferably the said lower roller bearing plates 17 have depending ends formed with projecting guide lugs 20 that work in vertical grooves 21ᵃ formed in the inner ends of the end brackets 2. The rollers 19 are preferably cylindrical, but are set with their axes radiating from the axis of the pivotal connection formed by the hubs 13 and 14. The lower and upper bearing plates 17 and 18 are preferably both formed with flat recessed bearing surfaces for the rollers 19, and with segmental inner and outer ribs for holding the rollers against endwise movements, but permitting the same to travel in respect to both of the said bearing plates. The upper roller bearing plates 18 are bolted or otherwise rigidly secured to the ends of the car body bolster 15. Preferably each set of rollers 19 is mounted in a horizontal extended marginal cage plate 21, which is located between the coöperating lower and upper bearing plates, and is provided at one side with a loosely mounted pinion 22 that meshes with teeth 23 on the said bearing plates 17 and 18. This pinion 22 and the teeth 23 coöperate with the so-called cage plate 21 to hold the rollers always in proper positions in respect to the plates 17 and 18.

The numeral 24 indicates brake hanger lugs shown as cast integral with the end portions of the rigid truck bolster 11.

By arranging the car supporting springs in tandem, or in rows longitudinally of the truck side frames, wide bases of support for the car body bolsters are afforded, and at the same time, the weight of the car body and load is transmitted to the truck side frames in vertical planes that intersect the said truck side frames longitudinally and centrally, thereby relieving the said truck side frames from torsional strains. In fact, the intermediate portions of the car body bolsters and of the truck bolsters are relieved from the load, and the load is transmitted from the car body direct to the axle boxes through the roller side bearings, the springs and the truck side frames, all of which parts are vertically alined and contained within transverse dimensions of the said truck side frames.

The truck above described is very strong and durable, and furthermore, may be constructed at a minimum of cost for a given load carrying capacity.

What I claim is:

1. The combination with a car truck, having side frames made up of laterally spaced beams and longitudinally spaced end brackets rigidly connected thereto, of a truck bolster rigidly connecting the said side frames, springs mounted in tandem arrangement in pockets formed therefor in said side frames, between said laterally spaced beams and longitudinally spaced end brackets, lower roller bearing plates mounted on said springs and guided for vertical movements by the inner end portions of said end brackets, rollers mounted on said lower bearing plates with their axes extending transversely of the truck, upper bearing plates mounted on said rollers for movements longitudinally of the truck, and a body bolster supported on said upper bearing plates, and pivotally connected to the central portion of said truck bolster with freedom for vertical movements in respect thereto.

2. In a car truck, the combination with side frames made up of laterally spaced beams and longitudinally spaced end brackets rigidly connected thereto, of a truck bolster having flanged ends rigidly secured to the inner members of said laterally spaced beams, said truck bolster having a centrally located hub, of springs seated in said side frames, roller side bearings supported by said springs, and body bolsters supported by said side bearings, and having a depending hub working pivotally within the hub of said truck bolster with freedom for vertical movements in respect thereto.

In testimony whereof I affix my signature in presence of two witnesses.

JOHN C. BARBER.

Witnesses:
 L. W. BARBER,
 A. M. LOVE.